US006919123B2

(12) United States Patent
Labrousse et al.

(10) Patent No.: US 6,919,123 B2
(45) Date of Patent: Jul. 19, 2005

(54) TRANSPARENT AND/OR TRANSLUCENT CARD WITH THREE-DIMENSIONAL GRAPHICS

(75) Inventors: Laurent Labrousse, Hatfield, PA (US); Cindy Rotondo, Lower Gwynedd, PA (US); Christopher Bailey, Gwynedd Valley, PA (US); Maureen Kane, Horsham, PA (US); Denise Bosler, Pheonixville, PA (US)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/994,845

(22) Filed: Nov. 28, 2001

(65) Prior Publication Data

US 2003/0017312 A1 Jan. 23, 2003

Related U.S. Application Data

(63) Continuation-in-part of application No. 09/722,520, filed on Nov. 28, 2000, now abandoned.

(51) Int. Cl.[7] ............................ B32B 3/00; B32B 7/12; B32B 27/04

(52) U.S. Cl. .................... 428/195.1; 428/203; 428/204; 428/207; 428/300.7; 428/354

(58) Field of Search .............................. 428/195, 195.1, 428/345, 354, 203, 204, 207, 300.7; 235/487

(56) References Cited

U.S. PATENT DOCUMENTS

| | | | | | |
|---|---|---|---|---|---|
| 6,261,684 | B1 | * | 7/2001 | Takahashi et al. | 428/345 |
| 6,290,137 | B1 | | 9/2001 | Kiekhaefer | |
| 6,296,188 | B1 | * | 10/2001 | Kiekhaefer | 235/487 |
| 6,581,839 | B1 | * | 6/2003 | Lasch et al. | 235/487 |

FOREIGN PATENT DOCUMENTS

| | | |
|---|---|---|
| WO | WO 01/18745 A2 | 3/2001 |

* cited by examiner

*Primary Examiner*—Rena Dye
*Assistant Examiner*—Lawrence D. Ferguson
(74) *Attorney, Agent, or Firm*—Burns, Doane, Swecker & Mathis, LLP

(57) ABSTRACT

A non-opaque plastic card, having a first sheet layer with a front surface and a back surface, and a second sheet layer having a front surface and a back surface. A filter dye is located on the first sheet layer and/or second sheet layer, and allows visible light to pass through, while blocking infrared light from passing through the card. Graphical elements are printed on different surfaces of the card, with different combinations of backgrounds, to produce 3-dimensional effects.

40 Claims, 5 Drawing Sheets

TRANSPARENT AND/OR TRANSLUCENT CARD WITH THREE-DIMENSIONAL GRAPHICS

This disclosure is based upon, and is a continuation-in-part of U.S. application Ser. No. 09/722,520, filed Nov. 28, 2000, now abandon, the content of which is incorporated herein by reference.

BACKGROUND OF THE INVENTION

A. Field of Invention

The present invention relates to plastic cards that are carried by individuals, such as credit cards, security cards, smart cards, loyalty cards, phone cards, and the like. More specifically, the present invention relates to a transparent and/or translucent card that can block infrared light while allowing visible light to pass through the card, and that includes three-dimensional graphics that take advantage of the transparent/translucent properties of the card.

B. Related Art

Credit cards, bank cards and other like cards have become more popular as is the applications for these types of cards has increased. Producers and manufacturers of these cards have further attempted to produce various designs on the cards to attract users of these cards.

Along these lines, there is a desire in the plastic card industry to produce a clear or otherwise transparent plastic card. The cards introduced so far, however, still block visible light to some degree, rather than being truly transparent. This is because the potential uses for a transparent card have been limited due to its inability to be detected by infrared (IR) sensors. For instance, most readers that are used in banking applications, e.g. ATM machines, employ IR sensors to detect the presence of a card in the reader. These sensors depend upon the card to block the path of an IR light beam. Since infrared light passes through a non-opaque card, the reader fails to detect when a card is inserted into it, which can frustrate users who are not able to complete transactions with the card. To be detectable, cards should have an opacity greater than 1.3 optical density for light in the range of wavelengths that include at least 700–1000 nm (the end of the visible range and the beginning of the near infrared range), pursuant to current ISO standards that apply to plastic cards. Clear cards which have been proposed to date do not meet this requirement.

In addition to readers, IR sensors are used throughout the card manufacturing process to detect the presence of a card, or core stock from which cards are made, at numerous locations. Again, a non-opaque material renders these sensors ineffective for their intended purpose.

SUMMARY OF THE INVENTION

The present invention provides a card, e.g. credit card, bank card, driver's license, that is a transparent and/or translucent, so that the user is able to see through the card, while at the same time enabling them to be detected by IR sensors. In addition, the card can contain three-dimensional graphics that utilize its transparent or translucent properties.

To achieve such results, the present invention provides a card which includes a filter within the structure of the card that is effective to block IR light within an appropriate range, but that allows visible light to pass, thereby creating a card which appears transparent to the naked eye. The transparency of the card enables various types of graphical designs to be employed on the card which present 3-dimensional effects to a person viewing the card.

The present invention provides the above advantages, amongst others, by means of one exemplary embodiment wherein a translucent and/or transparent card, comprising a first sheet layer having a front surface and a back surface and a second sheet layer having a front surface and a back surface, includes a filter dye located on the first sheet layer and/or second sheet layer which allows visible light to pass and blocks infrared light from passing through the card.

In one exemplary implementation of this embodiment, the filter dye comprises a solution containing a clear varnish, together with a first dye, a second dye and a third dye that are soluble within the varnish. The first dye blocks infrared light in a first portion of the wavelength range of about 700 nm to about 1000 nm, the second dye blocks light in a second portion in this range, and the third dye blocks light in yet another portion of this range. The combination of the first dye, second dye and third dye blocks all the infrared light emitted in the range of about 700 nm to about 1000 nm from passing through the card, thereby making the card detectable by infrared sensors. However, since the dyes do not significantly affect light at wavelengths below 700 nm, the card appears to be transparent to a viewer.

In a second embodiment of the invention, a polyester IR-reflecting film is laminated between the first and second sheet layers of the card. The film is made of nanolayers, each having a different natural strength of reflection. Through appropriate selection of the number and sequence of nanolayers, the film exhibits the property of reflecting IR light while transmitting visible light below about 750 nm.

The three-dimensional graphics are achieved by using different types of inks that exhibit different levels of opacity, and printing images with the various inks on different surfaces, both internal and external, of the layers which make up the card. Through appropriate combination of the types of inks and printing layers, a variety of different three-dimensional effects can be achieved.

BRIEF DESCRIPTION OF THE DRAWINGS

The invention will now be described in greater detail with reference to preferred embodiments illustrated in the accompanying drawings, in which like elements bear like reference numerals, and wherein.

DETAILED DESCRIPTION OF THE INVENTION

The present invention relates to a transparent and/or translucent plastic card. More specifically, the present invention relates to a transparent and/or translucent card that is particularly suited for use in a device having an infrared sensor for detecting the presence of the card, although it will be appreciated that the practical applications of the card are not limited to such uses. It should be noted that the terms "transparent" and "translucent" are used with reference to the card of the present invention. The term "transparent" is typically interpreted to mean that a material such as a plastic card allows light to be transmitted so that objects on the opposite side of the material from the viewer may be seen. "Translucent" is generally interpreted to mean that the card material allows light to pass through but there is a slight diffusion of the visible light to obscure perception of distinct images. Depending upon the particular effect to be created, in some applications a transparent card may be desirable, whereas in other cases a translucent card may be preferable. The principles of the present invention are equally applicable to both types of cards. In the description which follows, the term "non-opaque" is used to identify a material or card which can be either transparent or translucent.

The present invention concerns all types of cards. Such cards include, but are limited to, credit cards, security cards, smart cards, loyalty cards, bank cards, phone cards, driver's licenses, and the like.

Figure 1:
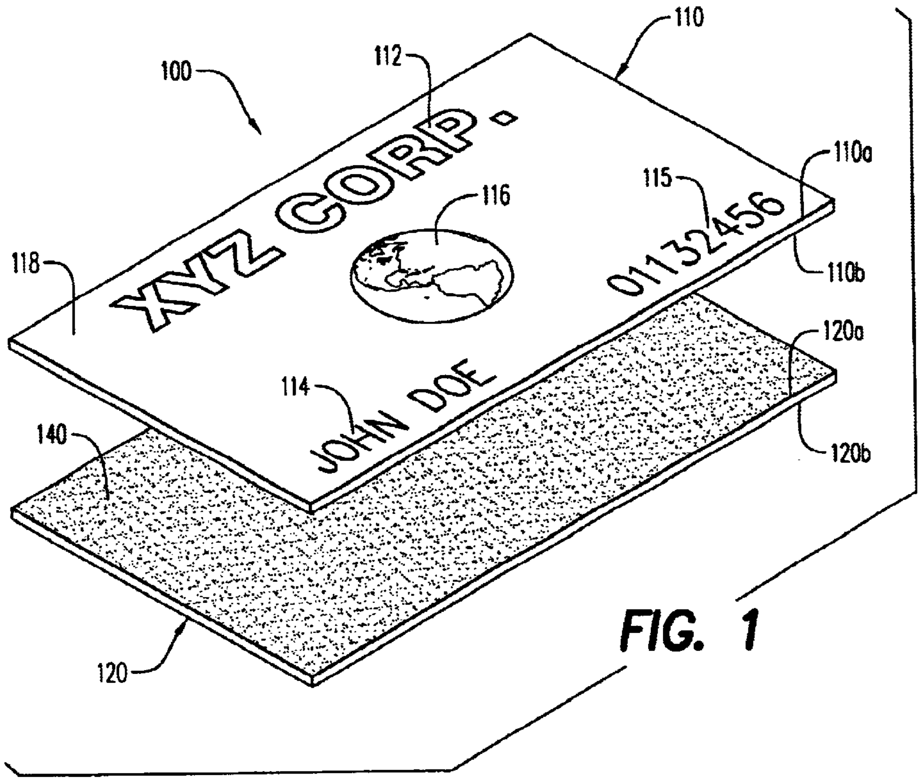
FIG. 1 illustrates a perspective view of an exploded exemplary embodiment of a transparent and/or translucent card in accordance with the present invention.

FIG. 1 illustrates one example of a non-opaque card 100 in accordance with the present invention. As is known in the art, the card may be comprised of at least two sheet layers, known as a front core stock 110 and a back core stock 120. Each sheet layer comprises a transparent material which is preferably flexible. In an exemplary embodiment the card is comprised of clear PVC material, a clear ABS material or the like. The card has a generally rectangular shape, however, the shape may change depending on the user's need or the application of the card. The two sheet layers 110 and 120 include a front surface 110*a*, 120*a* and a back surface 110*b*, 120*b*. To comply with the applicable standards relating to plastic cards, the thickness of each sheet layer is in the range of 150–1200 microns, and typically is about 325 microns to 365 microns.

The card 100 may include various types of artwork including text, graphical designs, and/or codes as may be desired by the issuer of the card, i.e. the company or organization with whom the card is affiliated. In the illustrated example, the name of the card issuer 112 is printed on the top surface of the front layer 110. Furthermore, the card includes a graphical design 116, the card owner's name 114 and a card identification number 115, e.g. credit card number. It should be noted that these various indicia may be printed on any or all of the front surfaces 110*a* and 120*a* and back surfaces 110*b* and 120*b* since the card 100 is non-opaque. The card 100 also includes a protective layer 118 applied over each of the exterior surfaces 110*a* and 120*b* to protect the printing on the card.

In the exemplary embodiment shown in FIG. 1, the card 100 further includes an infrared filter component 140. The filter component 140 may be located on any portion of the card, but preferably the filter component 140 is located between the interior surfaces 110*b*, 120*a* of the sheet layers 110 and 120, respectively. One purpose of the filter component 140 is to block IR light that is emitted onto the card 100, while at the same time allowing visible light to pass through the card 100. Thus, the filter component 140 needs to only be present in those portions of the card 100 onto which the IR light will be transmitted.

However, because various readers and other types of machines throughout the world may have IR sensors which could emit IR light onto various portions of the card, it is preferable to cover the entire surface area of the card with the filter component 140, so that the location of the IR sensor becomes irrelevant.

In one embodiment of the invention, the filter component 140 comprises a dye that is printed on one of the surfaces 110*b* or 120*a*. After such printing, the two sheet layers 110 and 120 are joined together by methods known in the art. In the exemplary embodiment, the two sheet layers 110 and 120 are laminated together, along with the outer protective layers 118. In a possible implementation of the invention, the filter dye 140 can be included in an adhesive that is used for the lamination of the card layers.

The ISO specifications that apply to plastic cards require cards to have an opacity greater than 1.3 optical density for light in the wavelength range of 400–950 nm (the visible and near infrared light range) and greater than 1.1 in the range of 950–1000 nm. This requirement is illustrated by the line S in FIG. 2. Compliance with this specification results in an opaque card, since it blocks light in the visible range of 400–700 run, as well as in the infrared range. The objective of the present invention is to provide a card having a low degree of absorbance in the visible light range of 400–700 nm, so that the card is non-opaque, while still blocking light in the near infrared range of 700–1000 nm. Thus, the filter dye should have an absorbance level or optical density (OD) which is as low as possible for wavelengths in the range of 400 nm to about 700 nm, and an absorbance level (OD) greater than 1.3 for wavelengths in a range that includes at least 700 nm to 950 nm, and greater than 1.1 nm in the range of 950 nm to about 1000 nm.

Figure 2:
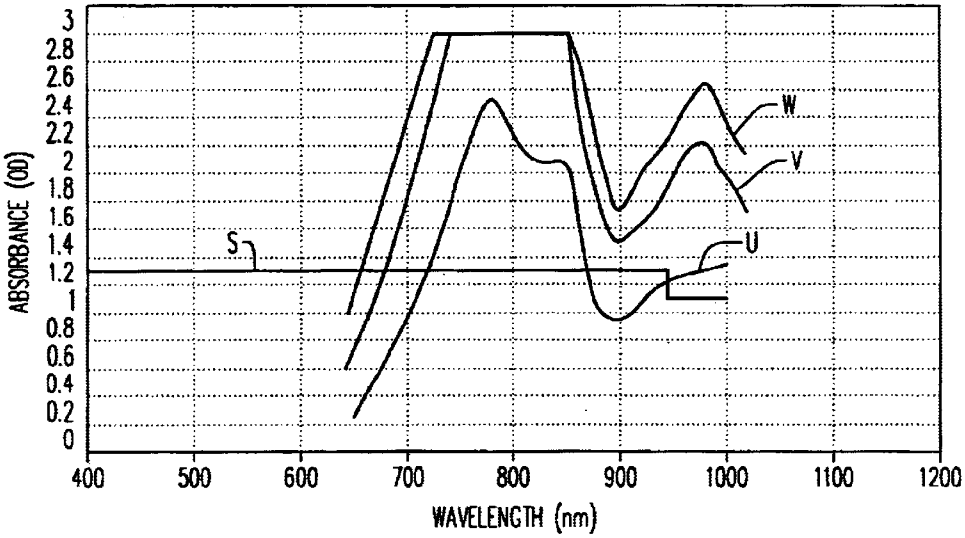
FIG. 2 is a graph showing the spectral characteristics for three examples of filter dye solutions, each comprising a different formulation of three individual dyes within a varnish.

FIG. 2 shows the spectral characteristics for three exemplary dye solutions, respectively labeled U, V and W. It is to be noted that these three dye solutions are merely exemplary of the many different filter dye solutions that can be employed to block IR light.

The Table below illustrates the various components that are in the three different dye solutions U, V and W represented in FIG. 2. In these particular examples, each solution comprises a mixture of a clear varnish that is conventionally employed as an ink formulation, together with three different individual dyes. The particular varnish that was used in examples, U, V and W is a solvent-based ink carrier sold by Sericol, Inc. under the trade name Teck Mark Mixing Clear. The three individual dyes represented in the chart are products of H.W. Sands Corp. and are sold as SDA 6825 (dye #1), SDC 7047 (dye #2) and SDA 1981 (dye #3). Each solution is printed on one of the surfaces 110*b* or 120*a* with a silkscreen process, and the spectral characteristics of a card produced with the solution is measured to provide the results illustrated in FIG. 2.

| Sol | Varnish | Dye #1 | Dye #2 | Dye #3 | Screen Mesh | Extra Ink |
|---|---|---|---|---|---|---|
| U | 97% | 0.5% | 0.75% | 1.75% | High | No |
| V | 97% | 0.5% | 0.75% | 1.75% | Med | No |
| W | 97% | 0.5% | 0.75% | 1.75% | Med | Yes |

The mesh value of the screen that is used in the silkscreen printing process determines the thickness or quantity of the solution that is coated on the card layer, wherein a higher mesh value results in a thinner coating. In the foregoing table, a "High" mesh value might be in the range of 325–375, whereas a "Medium" mesh screen might have a value in the range of 200–260. The last column of the Table indicates whether additional ink is printed onto the card, for example to make it darker or change its color. In the case of solution W, black ink was printed on the card using a lithographic process, resulting in slightly greater opacity.

As illustrated by FIG. 2, there are many factors which affect the light-blocking characteristics of the filter dye. For example, the various types of dyes that are mixed, the mesh screen dimension and additional ink all affect the results. As FIG. 2 illustrates, solution U does not produce the desired results throughout the entire spectrum of 700–1000 nm, primarily due to the fact that the thickness of the coating is too low, and therefore does not block a sufficient amount of light at all wavelengths. Conversely, solution W exceeds the minimum requirements by an appreciable margin. While this solution produces the intended results in the IR range, it may also attenuate more light at the high end of the visible wavelength range than is desirable. For this reason, solution V is the preferred solution of the three that are depicted in FIG. 2, since it meets the threshold for blocking light throughout the IR range, with minimal effect in the visible range.

Other factors which could affect the light blocking properties of the filter dye are the particular characteristics of the equipment that is used to produce the card. For instance, the results depicted in FIG. 2 for the three examples of the Table were obtained in a laboratory setting. It may be the case that the equipment used in a production line may have different parameters that affect the printing of the solution onto the card stock. In such a case, the relative amounts of one or more of the individual dyes may need to be adjusted to compensate for such differences.

The filtering dye solutions 140 of the foregoing examples impart a slight greenish tint to the card. If desired, a different color for the card can be obtained by printing a solution of lithographic ink having another tint on one of the other surfaces of the card, e.g. the back surface 120*b*. If a uniform tint is desired, an appropriate single-color ink can be applied over the entire surface, for instance via a process known as "flooding" the surface of the card. Alternatively, it may be desirable to produce different textured effects by using multiple tinting colors.

For instance, a 4-color printing process can be used to create a marbled effect by printing light and dark lithographic inks in a suitable pattern. Thus, various non-opaque cards with different ultimate tints can be produced, to provide a measure of distinctiveness among the cards of different issuers.

This technique imparts a particularly unique effect in the case of smart cards, which have a microprocessor chip embedded into their structure. In the manufacture of such a card, after the printing and lamination steps have been performed, the card is milled on the front surface thereof, to form a cavity into which a module containing the microprocessor chip and contacts are placed. This cavity has a depth which is greater than one-half the thickness of the card, so that the layer of filter dye is removed in the area of the cavity during the milling process. As a result, the back of the card has a different color in this area, e.g. it is only the color of the tint that was printed on the back surface of the card, or it is clear if no tint was printed. Furthermore, the chip module is visible from the back, particularly when the material of the back layer 120 is transparent. Consequently, the presence of the microprocessor chip in the card is accentuated when the card is viewed from the back side.

Figure 4A:
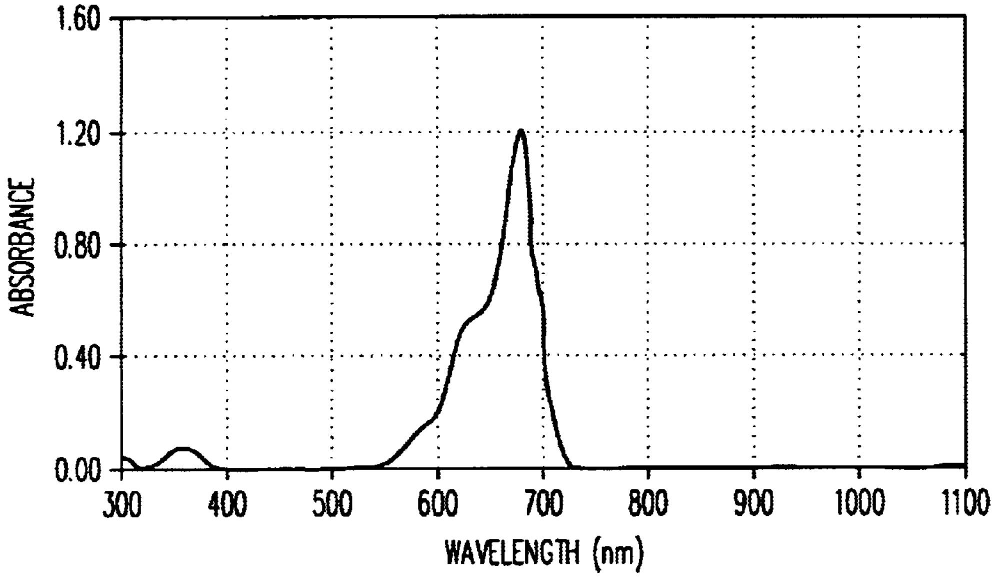
FIGS. 4*a*–4*c* are graphs showing the spectral characteristics of dye #1, dye #2 and dye #3, respectively, employed in the examples of FIG. 2.
Figure 4B:
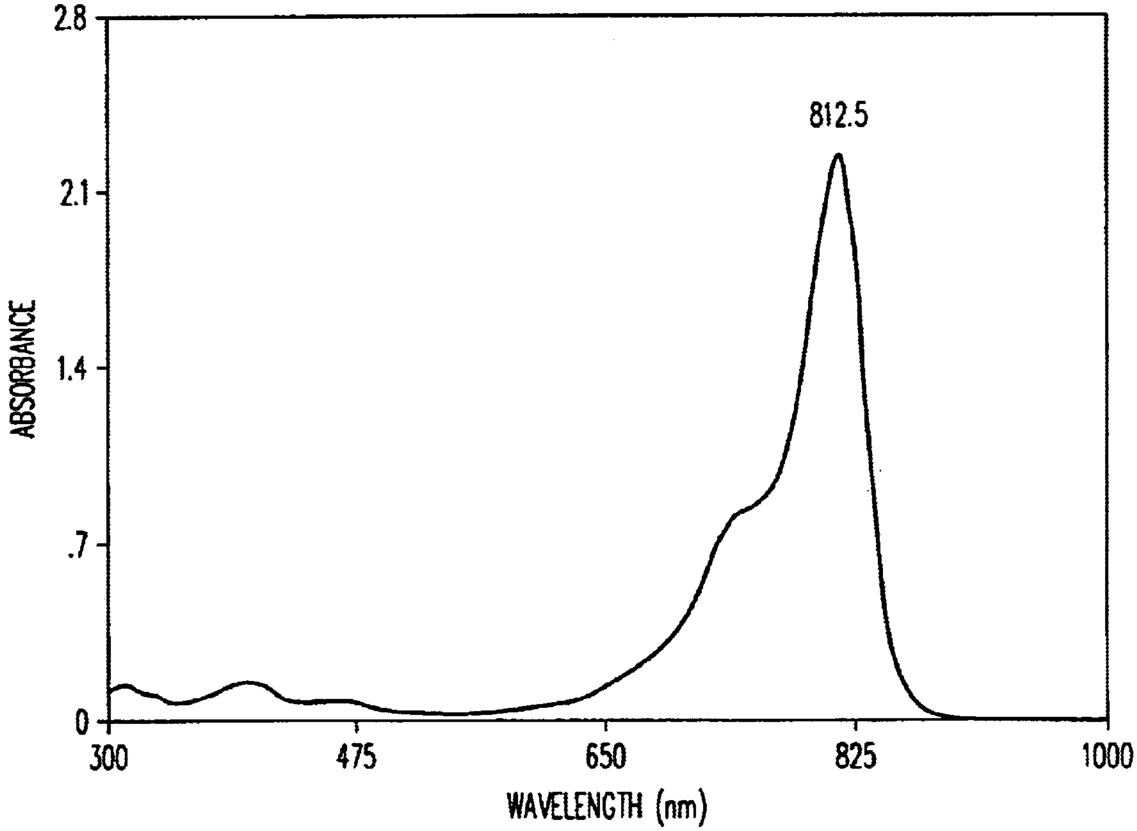
Figure 4C:
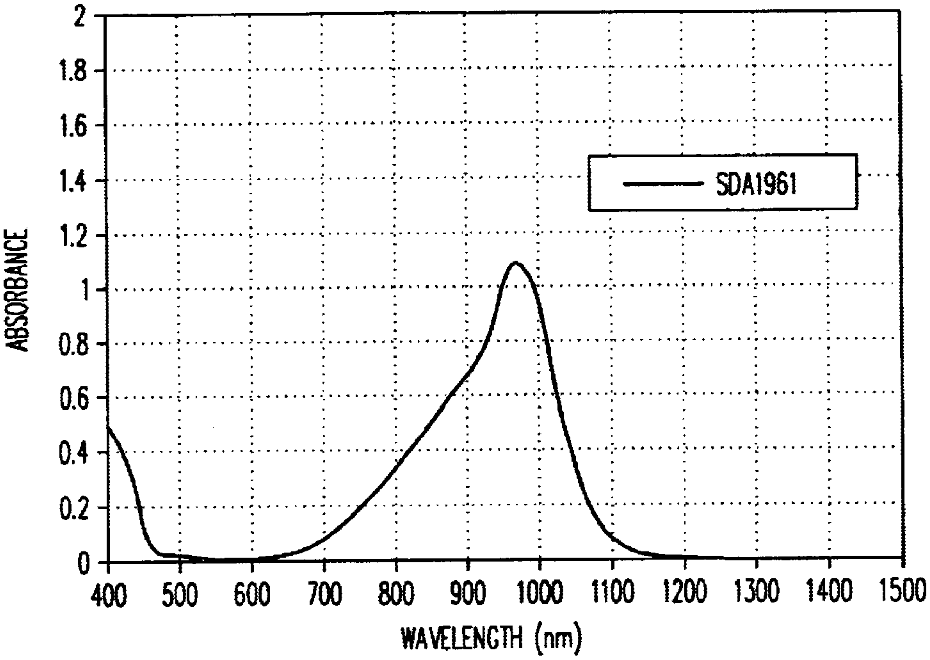

FIGS. 4*a*–4*c* are charts showing the spectral characteristics of dye #1, dye #2 and dye #3, respectively. Each of the individual dyes has a maximum absorbance at a different wavelength within the spectral range of interest. Specifically, dye #1 has its absolute maximum absorbance near the beginning of the range, at 745 nm, dye #2 has its absolute maximum near the middle of the range, at 813 nm, and dye #3 has its absolute maximum absorbance near the upper end of the range, at 971 nm. When mixed with the varnish, the combinations of the dyes present profiles such as those illustrated in FIG. 2.

It will be appreciated that other combinations of dyes which have absolute maximum absorbance values in the range of interest can be employed in place of the specific examples depicted in FIGS. 2 and 4*a*–4*c*. Depending upon the specific characteristics of the dyes, the solution may comprise less than three or more than three individual dyes to cover the entire range of interest. The dyes which are employed, however, should be compatible with the carrier, e.g. varnish, that they are to be used with, as well as provide the desired spectral results in the wavelength range of interest. For instance, if a solvent-based varnish is used, the dyes should be made from a compatible solvent-based material, to be soluble therein. Conversely, if a water-based carrier is employed, the dyes should also be made of compatible water-based materials.

The foregoing description has been provided with reference to an exemplary embodiment in which the IR filtering material is incorporated into the structure of the card by means of a varnish that is coated on one of the interior surfaces of the card. It will be appreciated that other implementations of the invention are possible as well. For example, the dyes could be integrated within the core stock that forms the layers 110 and/or 120, e.g. by mixing the dyes into the PVC or ABS material. Furthermore, the principles of the invention are applicable to a non-laminated card, such as a monolithic card that is made by injection molding techniques. In this case, the dye is preferably mixed with the material that is injected into the mold, such as ABS.

In a second embodiment of the invention, the IR filter component 140 comprises a transparent polyester film exhibiting IR reflecting characteristics. These types of films are generally described in Jonza, "Quarter-wave Polymeric Interference Mirror Films", *Optical Security and Counterfeit Deterrence Techniques III*, Proceedings of SPIE Vol. 3973 (2000). In general, these films consist of a number of nanolayers each having an optical thickness that is one-fourth of the wavelength of light to be reflected. In accordance with the invention, layers having different natural strengths of reflection are combined, so that it becomes possible to reflect light over the entire range of interest, e.g. 750–1000 nm, with a sharp drop-off in optical density outside of this range. Such a film is laminated between the two core stock sheets 110 and 120 of the card, resulting in a non-opaque card having good IR reflecting capabilities.

Since the card of the present invention is non-opaque, it becomes feasible to print designs on different ones of the surfaces 110*a*, 110*b*, 120*a* and 120*b* to present the impression that the various graphical elements of the artwork are 3-dimensional. As a further feature of the invention, specific combinations of printing techniques can be employed to enhance this 3-dimensional effect.

Figure 3:
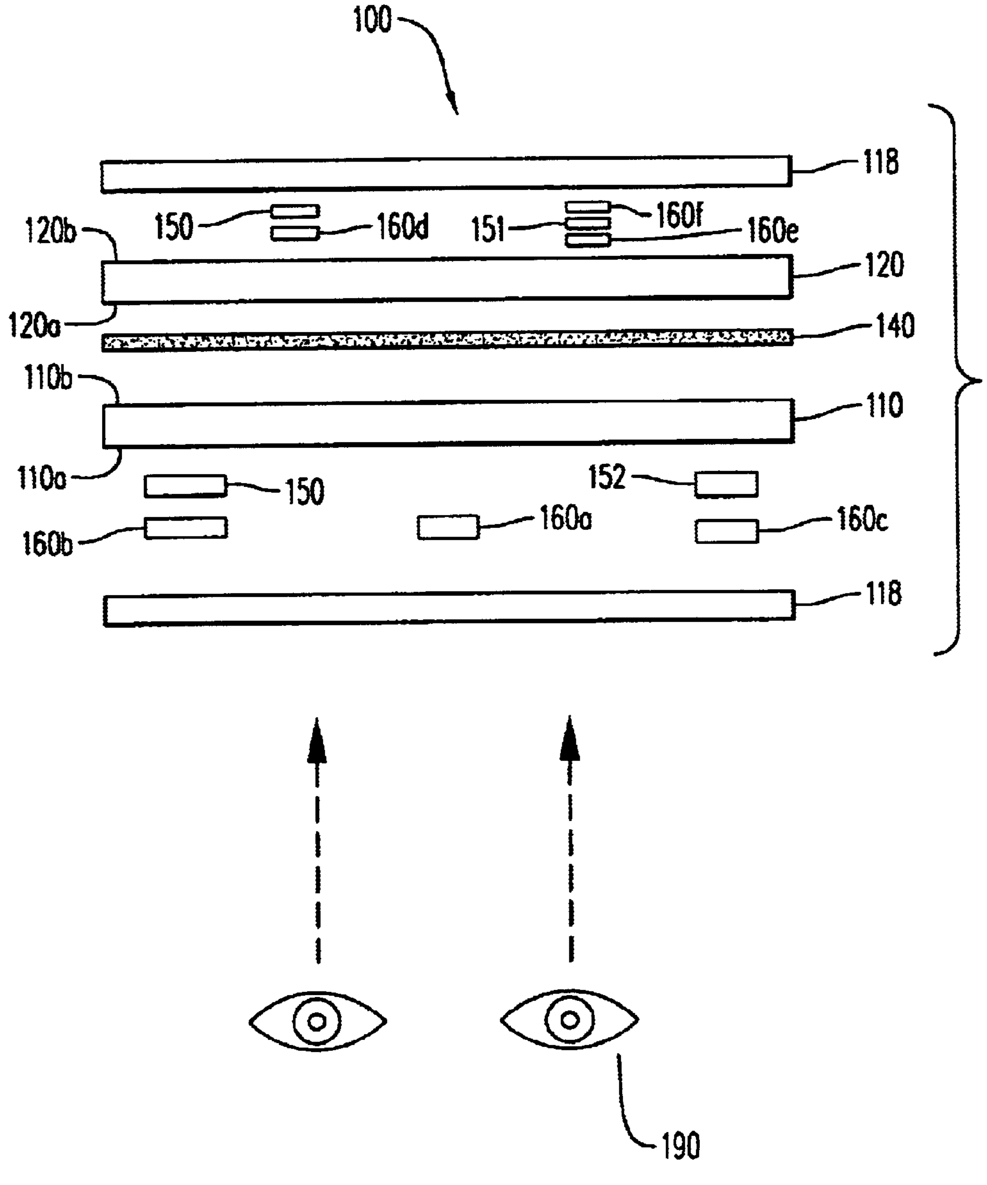
FIG. 3 illustrates an exploded side view of the various components of an exemplary embodiment of the card.

FIG. 3 illustrates an exploded side view of the various components of an exemplary embodiment of the card 100. The card 100 includes the first and second sheet layers 110 and 120. The filter component 140 is located between the first and second sheet layers 110 and 120. Various text, graphics and other indicia are located on the card. Typically, this artwork is printed onto the card using a silkscreen and/or lithographic color printing process. In order to give a 3-dimensional appearance to this artwork, different backgrounds are employed for the indicia, to create the impression of varying depths. One background can comprise a layer of opaque white ink 150, which might be produced by a screen printing process, which results in a relatively thick coat of ink. Another background can be a layer of translucent white ink 152, which can be produced by a lithographic printing process that results in a less dense coating. The third option is to have no background at all, as depicted with respect to the graphical element 160*a*.

These different combinations cause the graphical elements to appear more or less prominently on the card, and hence create the impression of being closer to or farther away from the viewer. For example, if the symbol 160*b* is printed on an opaque layer 150 and a user 190 is looking onto the card 100, it appears to the user that the symbol 160*b* is closer to the user, compared to graphical elements without the opaque background 150. When the graphical element 160*c* is printed on a translucent background layer 152, the lower degree of prominence resulting from this configuration makes it appear to the user 190 that the graphical element 160*c* is located farther away from the user 190, compared to the configuration having the opaque layer 150. An element 160*a* with no background appears as the faintest element, particularly if it is printed with a lithographic process. This configuration makes it appear to the user 190 that the element 160*a* is further away than both the element 160*b* with the opaque background 150 and the element 160*c* with the translucent background 152.

The graphical elements 160*a*–160*c* are illustrated in FIG. 3 as being printed on the exterior surface 110*a* of the front core stock layer 110. Where backgrounds 150 and 152 are employed, the backgrounds are first printed, followed by the colored graphical elements. Another graphical element 160*d* is illustrated as being printed on the exterior surface 120*b* of the back core stock layer 120, with an opaque white background 150. If it is desirable to have this element be viewable from the front of the card, the element is first printed on the surface 120*b* as a colored reverse or mirror image, followed by the background 150.

To provide 3-dimensional effects from both sides of the card, the graphical element can be printed on both sides of an opaque or translucent background. In this case, the printing process would comprise first printing a colored graphical element 160*e*, followed by a white background layer 151 on top of it, and then another colored layer 160*f* of the graphical element on the white background layer. The background layer 151 can be opaque white or translucent white, depending on the effect to be achieved.

While the foregoing examples have been described in connection with printing of the graphical elements on the exterior surfaces 110*a* and 120*b*, it is also possible to print graphical elements on the interior surfaces 110*b* and/or 120*a* of the card layers. By employing the different combinations of printing techniques on these various surfaces, the impression of objects at a variety of different depths can be created. As one example, if the graphical elements comprise images of fish, the card can present the appearance of fish that are swimming at all different distances within an aquarium or other body of water.

Another possible configuration is to hot-stamp various signs, symbols and the like onto the various layers of the card 100. The hot stamping process results in a graphical element having a polished metallic surface on one side thereof. When this surface appears on the front of the card, it is quite prominent. Conversely, it can be stamped on the rear exterior surface 120*b*, with the polished metallic portion facing inwardly. In this case, the graphical element is somewhat muted, but still quite discernable, creating the impression of depth.

In most varieties of credit cards, debit cards, smart cards, etc., it is conventional to print a rectangular area of opaque white ink on the back exterior surface of a card, for the card holder's signature. The printed area provides a surface with sufficient texture to enable a pen or other writing instrument to be used, in contrast to the slick surface of the card plastic itself, which typically does not provide enough surface friction to effectively use a pen or the like. In the case of a non-opaque card, however, this white opaque area may present clutter in the image provided by the graphics. In accordance with another feature of the invention, therefore, the signature area is defined with a clear ink. For instance, a clear varnish can be applied to the signature area using a silkscreen process. The varnish provides. sufficient texture for the writing instrument, but does not interfere with the image that is viewed from the front of the card.

While the invention has been described in detail with reference to preferred embodiments thereof, it will be apparent to one skilled in the art that these embodiments are merely illustrative examples of a variety of different filter materials can be integrated into the structure of a card to give it a non-opaque quality while rendering it detectable by IR sensors. Similarly, while a preferred range of 700–1000 nm has been described with reference to the IR blocking properties of the non-opaque card, other ranges might be appropriate for various applications of the card. Various changes can be made, and equivalents employed, without departing from the scope of the invention.

What is claimed is:

1. A plastic card, comprising:

a substrate having at least one sheet made of a non-opaque material and having a front surface and a back surface; and a plurality of graphical elements that are printed on at least one of the front and back surfaces of the substrate and visible through the card, said graphical elements including a first set in which each element of said first set comprises a colored layer and a respective corresponding background laver having a first level of opacity onto which said colored laver is printed, and a second set in which each element of said second set comprises a colored laver and a respective corresponding background layer having a second level of opacity onto which said colored layer is printed.

2. The card according to claim 1, wherein the graphical elements of said first set include an opaque white background layer and the graphical elements of said second set include a translucent white background layer.

3. The card according to claim 1, further including a third set of graphical elements in which each element of said third set comprises a colored layer that is printed directly on one of said surfaces without a background layer.

4. The card of claim 1, wherein at least one of said graphical elements comprises a first colored layer that forms an image of the element, a white background layer on said colored layer, and a second colored layer on said background layer that forms an image of the element, thereby permitting the image of said element to be viewed from both sides of the card.

5. The card of claim 1, further including an infrared-reflecting component that reflects infrared light in the range of about 700 nm to about 1000 nm, and transmits light having a wavelength less than about 700 nm.

6. The card of claim 5, wherein said infrared-reflecting component comprises a polyester film.

7. The card of claim 6 wherein said polyester film is laminated between first and second sheets of non-opaque material.

8. The card of claim 6 wherein said polyester film comprises multiple nanolayers having different respective natural strengths of reflection.

9. The card of claims 5, wherein said infrared-reflecting component comprises a filter dye, located on a surface of said sheet, which allows visible light to pass through the card and simultaneously blocks infrared light from passing through the card.

10. The card according to claim 9, wherein the filter dye comprises at least two dyes, wherein each of the at least two dyes blocks infrared light in a different portion of the range of about 700 nm to about 1000 nm; and the combination of the at least two dyes blocks all of the infrared light in the range of 700 nm to about 1000 nm.

11. The card of claim 1 further including a transparent tint dye on said sheet.

12. The card of claim 11 wherein said tint dye comprises a single color that is disposed over the entire surface of one side of said sheet.

13. The card of claim 11 wherein said tint dye consists of multiple colors that are printed onto a surface of said sheet in a pattern to produce a textured effect.

14. The card of claim 13 wherein said textured effect comprises a marbled effect.

15. The card of claim 1 further including a region of clear ink on an exterior surface of said substrate that defines a signature area.

16. The plastic card of claim 1, wherein the background layer of each graphical element in said first and second sets is contiguous with its corresponding colored layer.

17. The plastic card of claim 1, wherein some of said graphical elements are printed on the front surface of said substrate, and others of the graphical elements are printed on the back surface of said substrate.

18. The plastic card of claim 1, wherein each background layer conforms to its corresponding colored layer.

19. A plastic card, comprising:

a first sheet layer made of a non-opaque material and having a front surface and a back surface;

a second sheet layer made of a non-opaque material and having a front surface and a back surface;

a filter dye, located on one of said surfaces, which allows visible light to pass through the card and simultaneously blocks infrared light from passing through the card; and a plurality of graphical elements on at least one of the front and back surfaces of at least one of the first and second sheet layers, said graphical elements including a first set in which each element of said first set comprises a colored layer and a respective corresponding background layer having a first level of opacity onto which said colored layer is printed, and a second set in which each element of said second set comprises a colored layer and a respective corresponding background layer having a second level of opacity onto which said colored layer is printed.

20. The card according to claim 19, wherein the filter dye is printed on the back surface of the first sheet and/or the front surface of the second sheet.

21. The card according to claim 19, wherein the filter dye has a minimum absorbance level of 1.3 for light having a wavelength in a range that includes 700 nm and greater.

22. The card according to claim 21, wherein said range is approximately 700 nm to 1000 nm.

23. The card according to claim 21, wherein the filter dye permits visible light in a substantial portion of the range of 400–700 nm to pass through the card.

24. The card according to claim 19, wherein the filter dye permits visible light in a substantial portion of the range of 400–700 nm to pass through the card.

25. The card according to claim 19, wherein the first and second sheet layers are laminated together.

26. The card according to claim 19, wherein the filter dye comprises at least two dyes, wherein each of the at least two dyes blocks infrared light in a different portion of the range of about 700 nm to about 1000 nm; and the combination of the at least two dyes blocks all of the infrared light in the range of 700 nm to about 1000 nm.

27. The card according to claim 19, wherein the graphical elements of said first set include an opaque white background and the graphical elements of said second set include a translucent white background.

28. The card according to claim 19, further including a third set of graphical elements in which each element of said third set comprises a colored layer that is printed directly on one of said surfaces without a background layer.

29. A plastic card, comprising:

a sheet layer made of a non-opaque material;

a filter dye associated with said sheet layer and comprising a first dye, a second dye and a third dye, wherein the first dye blocks infrared light having wavelengths in a first portion of the range of about 700 nm to about 1000 nm, the second dye blocks light having wavelengths in a second portion of said range, and the third dye blocks light having wavelengths in a third portion of said range, and wherein the combination of the first, second and third dyes blocks all infrared light in said range while permitting substantially all visible light in a range below about 700 nm to pass through said card; and a plurality of graphical elements on said sheet layer, said graphical elements including a first set in which each element of said first set comprises a colored layer and a respective corresponding background layer having a first level of opacity onto which said colored layer is printed, and a second set in which each element of said second set comprises a colored layer and a respective corresponding background laver having a second level of opacity onto which said colored layer is printed.

30. The card according to claim 29, comprising first and second sheet layers that are laminated together.

31. The card according to claim 29, wherein said filter dye is incorporated in a film layer that is laminated with said first and second sheet layers.

32. The card according to claim 29, wherein said filter dye is incorporated in a solution that is printed on a surface of said sheet layer.

33. The card according to claim 29, wherein said filter dye is incorporated into the material of said sheet layer.

34. The card according to claim 29, wherein the graphical elements of said first set include an opaque white background layer and the graphical elements of said second set include a translucent white background layer.

35. The card according to claim 29, further including a third set of graphical elements in which each element of said third set comprises a colored layer that is printed directly on one of said surfaces without a background layer.

36. A plastic card, comprising:

a substrate having at least one sheet made of a non-opaque material and having a front surface and a back surface; and a plurality of graphical elements that are printed on at least one of said front and back surfaces and visible through the card, said graphical elements including a first set in which each element of said first set comprises a colored layer and a respective corresponding non-transparent background layer onto which said colored layer is printed, and a second set in which each element of said second set comprises a colored layer that is printed directly on one of said surfaces without a background layer.

37. The plastic card of claim 36, wherein the graphical elements of said first set include an opaque white background layer.

38. The plastic card of claim 37, wherein said background layer is printed with a screen printing process.

39. The plastic card of claim 36, wherein the graphical elements of said first set include a transparent white background layer.

40. The plastic card of claim 39, wherein said background layer is printed with a lithographic printing process.

* * * * *